(12) United States Patent
Huang et al.

(10) Patent No.: US 8,276,065 B2
(45) Date of Patent: Sep. 25, 2012

(54) SYSTEM AND METHOD FOR CLASSIFYING ELECTRONICALLY POSTED DOCUMENTS

(75) Inventors: Anita Wai-Ling Huang, Oakland, CA (US); Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1460 days.

(21) Appl. No.: 11/526,470

(22) Filed: Sep. 23, 2006

(65) Prior Publication Data
US 2007/0022374 A1 Jan. 25, 2007

Related U.S. Application Data

(63) Continuation of application No. 09/513,058, filed on Feb. 24, 2000, now Pat. No. 7,137,065.

(51) Int. Cl.
*G06F 17/00* (2006.01)
(52) U.S. Cl. .......................................... 715/254; 715/234
(58) Field of Classification Search .................. 715/254, 715/200, 234
See application file for complete search history.

(56) References Cited

U.S. PATENT DOCUMENTS

| | | | |
|---|---|---|---|
| 5,884,304 A | 3/1999 | Davis, III et al. ................. 707/4 |
| 5,913,208 A | 6/1999 | Brown et al. ..................... 707/3 |
| 5,956,726 A | 9/1999 | Aoyama et al. ............... 707/102 |
| 6,181,342 B1 * | 1/2001 | Niblack ......................... 345/635 |
| 6,269,362 B1 | 7/2001 | Broder et al. ...................... 707/4 |
| 6,397,209 B1 * | 5/2002 | Reed et al. ........................ 707/3 |
| 6,502,112 B1 | 12/2002 | Baisley ......................... 715/210 |
| 6,547,829 B1 | 4/2003 | Meyerzon et al. ............ 715/234 |
| 6,606,620 B1 * | 8/2003 | Sundaresan et al. .............. 707/3 |
| 6,889,223 B2 * | 5/2005 | Hattori et al. ..................... 707/3 |
| 7,017,114 B2 * | 3/2006 | Guo et al. ...................... 715/247 |
| 7,069,501 B2 * | 6/2006 | Kunitake et al. .............. 715/234 |
| 7,162,413 B1 * | 1/2007 | Johnson et al. ................... 704/9 |
| 7,260,773 B2 * | 8/2007 | Zernik .......................... 715/229 |
| 7,509,572 B1 * | 3/2009 | Melander et al. ............. 715/234 |
| 2001/0018697 A1 * | 8/2001 | Kunitake et al. .............. 707/517 |
| 2003/0033314 A1 * | 2/2003 | Muschenborn ............... 707/100 |

* cited by examiner

*Primary Examiner* — Manglesh M Patel
(74) *Attorney, Agent, or Firm* — Stephen Bongini; Fleit Gibbons Gutman Bongini & Bianco PL

(57) ABSTRACT

A method for classifying electronically posted documents includes receiving two posted documents and generating corresponding metadata summaries for each, wherein each of the metadata summaries includes at least one sub-tree structure. The structures of the two summary sub-trees within the respective metadata summaries are subsequently compared. If the two summary sub-trees are different, the two documents are deemed distinct. If the two summary sub-trees are the same, attribute values and text content of the metadata summaries are compared over a portion of the metadata summaries. If the compared attribute values and text content are determined to be the same, the documents are deemed duplicative.

10 Claims, 6 Drawing Sheets

FIGURE 2A

```
<?xml version="1.0"?>
<rdf:RDF xmlns:rdf="http://www.w3.org/schemas/rdf-schema">
    <!--
        This RDF Description contains information about (1) the data gatherer and
        (2) the metadata of the data source.
    -->
    <rdf:Description gatherer="Grand Central Station Gatherer II"    — 210
                     gathered-on="Tue Mar 23 17:38:40 GMT 1999"
                     summarizer="com.ibm.almaden.gcs.summarizer.HTMLSummaryMaker"

resource="http://www.people.com/jane_doe/homepage.html"    — 220
                     source-last-modified="Tue Feb 17 15:43:58 GMT 1999"
                     mime-type="http/html"
                     content-length="46220"
                     source-is="Good"
                     comments="good"/>
    <!--
        This RDF Description contains information about from the data source itself.
        In addition to textual information, it contains structural information, for example
        the URLs that the page points to.
    -->
    <rdf:Description html-title="Jane's Homepage"    — 231
                     html-encoding="8859_1"    — 232
                     abstract="Personal homepage of Jane Doe">    — 233
        <!--
            The "ref-annotations" contains summaries of the out-links of the HTML
            page. In this case, the attribute "ref" gives the URL of the referenced
            page. The attribute "annotation" gives the text associated with each
            out-link.
        -->
        <ref-annotations>                                           234
            <rdf:Bag>
                <rdf:LI>                                            234a
                    <rdf:Description
                        ref="http://www.yahoo.com/"
                        annotation="Yahoo!"/>
                </rdf:LI>
                <rdf:LI>                                            234b      234c
                    <rdf:Description
                        ref="http://www.people.com/jane_doe/my_photo.jpg"
                        annotation="picture of me."/>
                </rdf:LI>                                           234d
            </rdf:Bag>
        </ref-annotations>
        <!--
            The "presentation-text" contains the textual content of the HTML page
            that may be seen through a WWW browser.
        -->
        <presentation-text>                                         236
            <rdf:Bag>
                <rdf:LI>Welcome to my homepage. </rdf:LI>
                <rdf:LI>Use Yahoo! to search for something or look
                        at a picture of me.</rdf:LI>
            </rdf:Bag>
        </presentation-text>
    </rdf:Description>
</rdf:RDF>
```

230

US 8,276,065 B2

SYSTEM AND METHOD FOR CLASSIFYING ELECTRONICALLY POSTED DOCUMENTS

BACKGROUND OF THE INVENTION

This is a continuation of application Ser. No. 09/513,058, filed Feb. 24, 2000, now U.S. Pat. No. 7,137,065. The entire disclosure of prior application Ser. No. 09/513,058 is herein incorporated by reference.

FIELD OF THE INVENTION

This invention relates generally to systems and methods for comparing and classifying documents, and in particular to systems and methods for classifying electronically posted documents used in conjunction with search engines.

DESCRIPTION OF THE RELATED ART

The Internet, a global network connecting millions of computers, is increasingly becoming the preferred way to disseminate information. An estimated 150 million people worldwide use the Internet to access and exchange information.

Both commercial and non-commercial entities have recognized the growing use of the Internet and have thus accelerated the posting of "electronic documents" to provide access to their information. As known, "electronically posted documents" ("documents," herein) may contain any type of information which can be electronically communicated. These documents, typically web pages, are posted on the world wide web, a system of internet-accessible web servers. Individual companies set up one or more web sites using a web server to support web page publication and communication. Some examples of information which can be included in an electronic document such as a web page includes data, text, facsimile, audio, video, graphics, as well as other types of information.

In many instances, the user may not know the web site location (URL address) which contains the desired information. Alternatively, the user may prefer to browse similar information obtained from a variety of different web sites. In these cases, the user may employ a search engine to locate one or more web pages containing information about the desired topic.

Conventional search engines, such as Yahoo®, Alta Vista® and Excite® use several programs to retrieve web pages containing the requested information. Typically, a "spider" or "webcrawler" program is used to locate and download posted documents. Once downloaded, an "indexer" program reads the documents and creates an index based on the words contained in each document. Upon entry of one or more of the indexed keywords, the search engine provides to the requester a listing of the search results, typically in the form of HTML links, each listing corresponding to one of the indexed documents. The user may then click on one of the displayed HTML links to access information on a particular web page. Each provider's search engine typically uses proprietary webcrawler and indexing programs which locate and return the most comprehensive set of documents in the shortest amount of time.

A problem associated with the aforementioned process is the listing of duplicate documents in the search results. Duplications inconvenience the user by directing him/her to seemingly distinct documents which, in fact, contain identical content.

To minimize the occurrence of duplicate listings, a textual comparison process was developed by which the text content of two downloaded or listed documents is compared. If the text of the two documents match, the documents are deemed duplicative and one could then be discarded without loss of information.

One disadvantage of the conventional textual comparison process is that it performs a pair-wise document comparison process on a non-selective basis. For example, the conventional textual comparison process will compare documents of different mime-types which are inherently dissimilar. Performing these unnecessary document comparisons lengthen the system's response time. Another disadvantage of the conventional process is that it does not ensure elimination of content-duplicate listings. Documents which contain identical content but which include different attributes (such as metadata "href" elements), are typically identified as different documents using the conventional textual comparison process. These documents in fact are content-identical and provide no additional information to the searcher.

In view of the disadvantages suffered by the conventional system and process, a new system and method for classifying posted documents is needed.

SUMMARY OF THE INVENTION

The present invention provides new systems and methods for efficiently classifying electronically posted documents. The classification process employs a multi-tiered comparison process in which portions of corresponding metadata summaries are compared at the structural, attribute, and text level. This comparison process provides a fast and accurate means of determining if two posted documents are duplicative or distinct.

In one embodiment of the invention, a method for classifying posted documents is presented which includes the processes of receiving two posted documents and generating corresponding metadata summaries for each, wherein each of the metadata summaries includes at least one sub-tree structure. The structures of the two summary sub-trees within the respective metadata summaries are subsequently compared. If the two summary sub-trees are different, the two documents are deemed distinct.

In another embodiment of the invention, a system for classifying posted documents is presented. The system includes a metadata parser module, a summary repository, and a summary consolidator. The metadata parser module receives electronically posted documents and in response outputs respective metadata summaries, wherein each of the respective metadata summaries include one or more sub-trees structures, one or more attributes, and content text. The summary repository is coupled to receive and store the respective metadata summaries. The summary consolidator is coupled to the summary repository and is configured to delete duplicate metadata summaries from the summary repository.

Other embodiments of the present invention will be gleaned from a study of the following drawings and detailed description of the preferred embodiments.

BRIEF DESCRIPTION OF THE DRAWINGS

FIG. 2A illustrates a XML/RDF metadata summary generated by the metadata parser module in accordance with one embodiment of the present invention.

DESCRIPTION OF THE PREFERRED EMBODIMENT

Figure 1A:
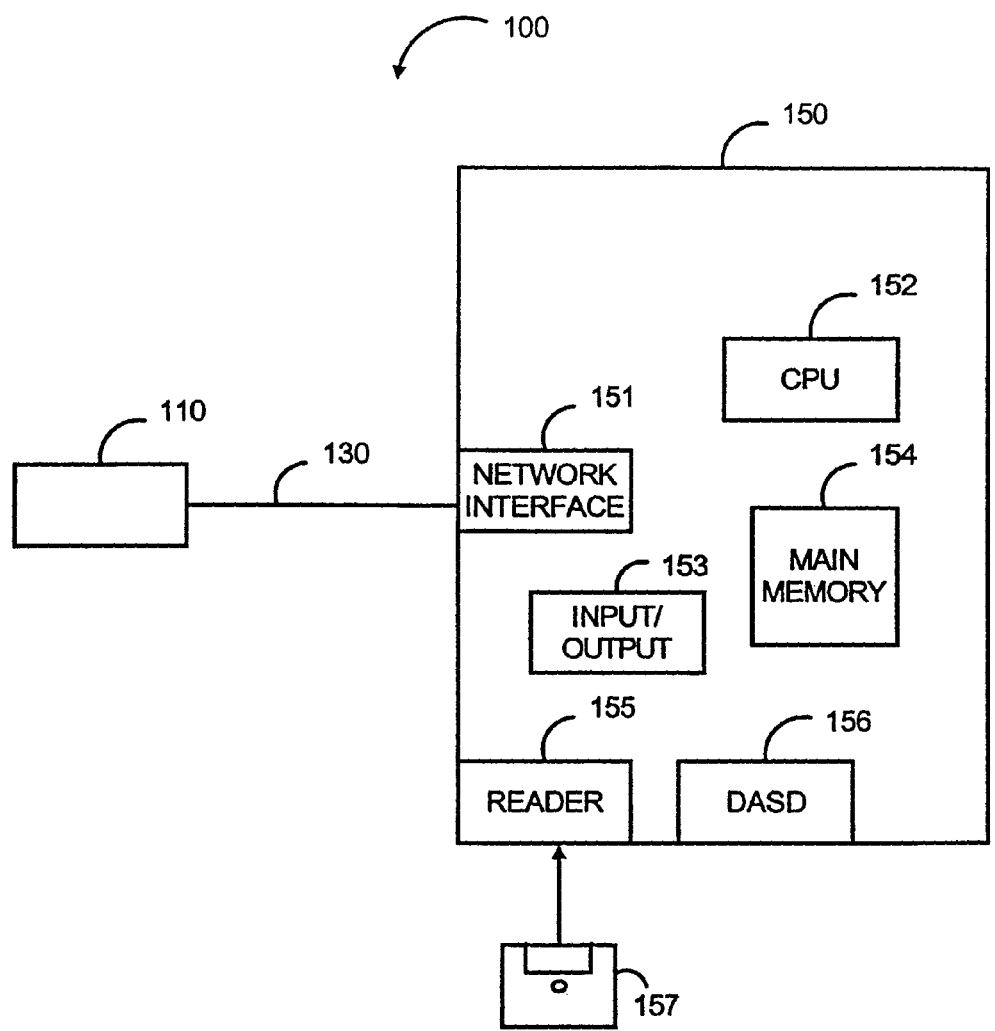
FIG. 1A is a block diagram of an exemplary posted document classification system in accordance with the present invention.

FIG. 1A is a block diagram of an exemplary posted document classification system 100 in accordance with the present invention. The system 100 includes a document posting device 110 coupled to a computational device 150 via a communication link 130. In one embodiment, document posting device 110 may be an internet-accessible web server and the communication link 130 may be a hardwired or wireless TCP/IP internet connection. In an alternative embodiment, the posted document device 110 may be incorporated within the computational device 150 itself.

The computational device 150 includes a network interface connection 151, a CPU 152, an input/output device 153, such as a keyboard and monitor, and a main memory 154 for storing data and programming instructions. Other computer components such as a disk drive 155, configured to accept a magnetic floppy disk 157, and a direct access storage device (DASD) 156 for storing data and programming may also be included. Data and/or program instructions may be stored on the computer-readable medium 157, in which case the reader 155 reads and communicates the data and/or programming instructions to the main memory 154.

Figure 1B:
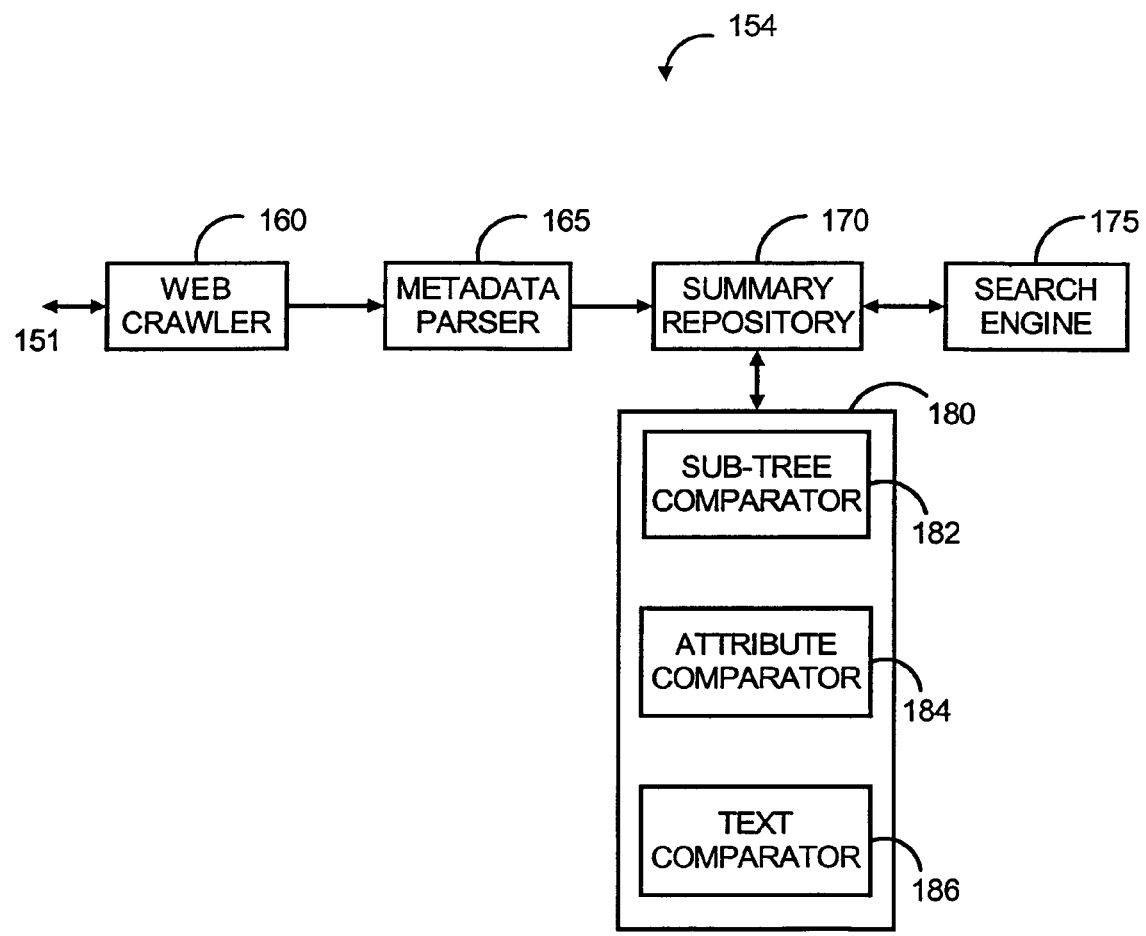
FIG. 1B illustrates a simplified block diagram of programming modules used in executing the method of the present invention.

FIG. 1B illustrates a simplified block diagram of the main memory 154 in which programming modules reside for executing the method of the present invention. Included within main memory 154 is a web crawler module 160, a metadata parser module 165, a summary repository 170, a search engine module 175, and a summary consolidator module 180.

The web crawler module 160 searches and retrieves, via the network interface 151 and the communication link 130, electronically posted documents from posted document device 110. The retrieved documents may be stored in the main memory 154 or in the DASD 156. The metadata parser module 165 receives the downloaded documents and generates a metadata summary which is organized into one or more sub-tree structures in which attributes and/or text content is contained. An exemplary embodiment of a metadata summary is shown in FIG. 2A, further described below. The generated metadata summary is stored in the summary repository 170, which is preferably a database configured to store the generated metadata summaries. The summary repository 170 may reside partially or entirely within the main memory 154 or the DASD 156. The search engine module 175 is in communication with the summary repository and preferably includes a document indexer/user interface operable to provide information contained within one or more of the stored metadata summaries in response to receiving the user's entry of specific keywords. In a specific embodiment, the search engine 175 may include any of the aforementioned commercially available search engines. In alternative embodiments, the search engine may be a specially designed search engine for indexing metadata summaries and retrieving information such as html links contained therein in response to the user's entry of specific keywords.

The summary consolidator module 180 is in communication with the summary repository and further includes sub-tree comparator 182, attribute comparator 184, and value comparator 186. As will be further described below, the summary consolidator module 180 selects metadata summaries from the summary repository 170, and compares them on a structural, attribute, and textual level to determine if the posted documents to which the compared summaries correspond are duplicates. If the metadata summaries are determined to be duplicates, the duplicate metadata summary is removed so that the summary repository 170 only stores distinct metadata summaries corresponding to distinct documents.

FIG. 2A illustrates one embodiment of a metadata summary 200 generated by the metadata parser module 165. The metadata summary 200 is illustrated in resource description framework (RDF), although other formats or languages, such as attribute-value pairs, as well as others may be used in alternative embodiments.

The metadata summary 200 includes three portions which summarize the data contained in its corresponding web page: a data gatherer portion 210, a metadata portion 220, and a datasource portion 230. The data gatherer portion 210 includes information about the data gatherer, such as the assigned title of the data gatherer and date of gathering. The metadata portion 220 includes information about the web page source, such as the date of web page update and the document's mime-type. The datasource portion 230 includes information about the web page data itself, or the metadata proper. This portion may include information such as the web page's title, abstract, presentation format, encoding, textual content, applets, scripts, embedded images and other multimedia, information about out-links and/or in-links, as well as other metadata.

In the illustrated embodiment of FIG. 2A, the datasource portion 230 includes three attributes 231, 232, and 233 and two sub-parts (sub-trees) 234 and 236. Attribute 231 includes an attribute name: "html-title," and an attribute value: "Jane's Homepage." Attributes 232 and 233 list additional attribute names and corresponding values, respectively.

Attribute names, attribute values, and text content are stored within "bags" and "list items" nested within sub-tree structures 234 and 236. As known in the art, the terms "Bag," "LI," and "Description" are RDF structural constructs which the summary consolidator module 180 recognizes in the document grouping process, further described below.

In the illustrated embodiment, the sub-tree 234 includes a "bag" (rdf:Bag) in which a first "list item" (rdf:LI) contains a first ref attribute 234a and a first ref annotation 234b. The "bag" also includes a second "list item" (rdf:LI) containing a second ref attribute 234c and a ref annotation 234d. As known in the art, the ref attributes 234a and 234c indicate the destination of the HTML link (out-link) when activated. The annotation attributes 234b and 234d give the text associated with the out-link. In the illustrated embodiment, the first ref attribute 234a has a value of "http://www.yahoo.com/," and the second ref attribute 234c has a value of "http://www-.people.com/jane_doe/my_photojpg." The first ref annotation 234b has a value of "Yahoo!" and the second ref annotation 234d has a value of "picture of me." Of course, additional ref attributes and annotations may be used having similar as well as different values in alternative embodiments.

Sub-tree 236 defines a presentation description attribute. As known in the art, the presentation description contains textual content of the HTML page viewable through a world wide web browser. In the illustrated embodiment, the sub-tree 236 includes a "bag" (rdf:Bag) having a first "list item" (rdf: LI) containing the textual content: "Welcome to my homepage." The "bag" also includes a second "list item" containing the textual content "Use Yahoo! to search for something or look at a picture of me."

Figure 2B:
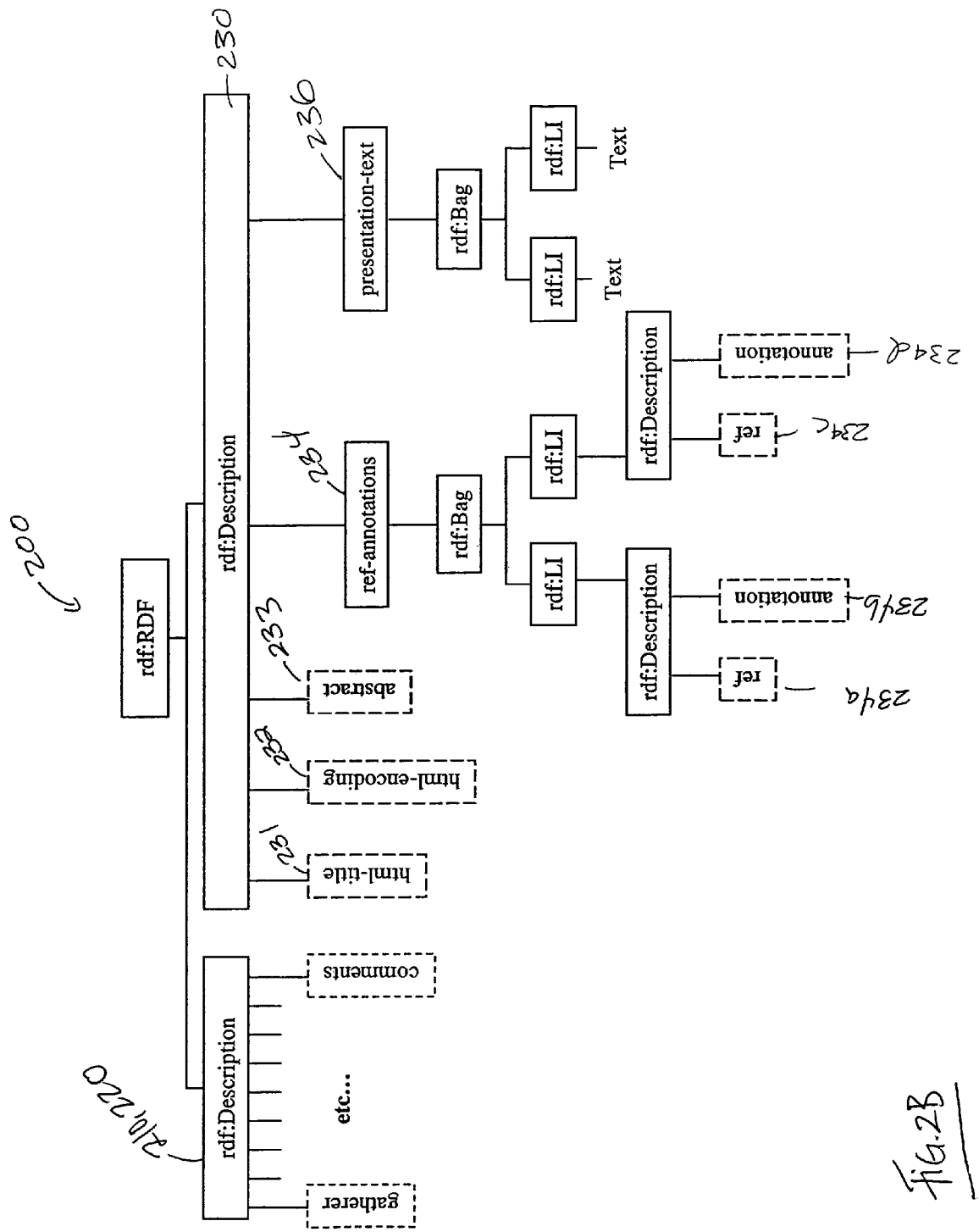
FIG. 2B illustrates a graphical mapping of the metadata summary shown in FIG. 2A in accordance with one embodiment of the present invention.

FIG. 2B represents a graphical mapping of the metadata summary 200. The data gather portion 210 and the metadata portion 220 are included under a first RDF description node which includes attributes as shown in the summary 200. A second RDF description node defines the datasource portion 230 and includes metadata attributes 231, 232, and 233, as well as metadata sub-trees 234 and 236. Metadata sub-tree 234 (ref-annotations) includes several nodes; specifically, an RDF "bag" (rdf:Bag) which includes two RDF "list items" (rdf:LI), each including an RDF "description" (rdf:Description). Each RDF "description" has two attributes named "ref" and "annotation." The metadata subtree 236 (presentation text) also includes several nodes; particularly an RDF "bag" node which itself includes two RDF "list item" nodes, each of which include text content. As will be further explained below, by comparing the structures of the metadata summaries, and in particular, the sub-structures of their metadata portions, summaries can be classified faster.

Figure 3:
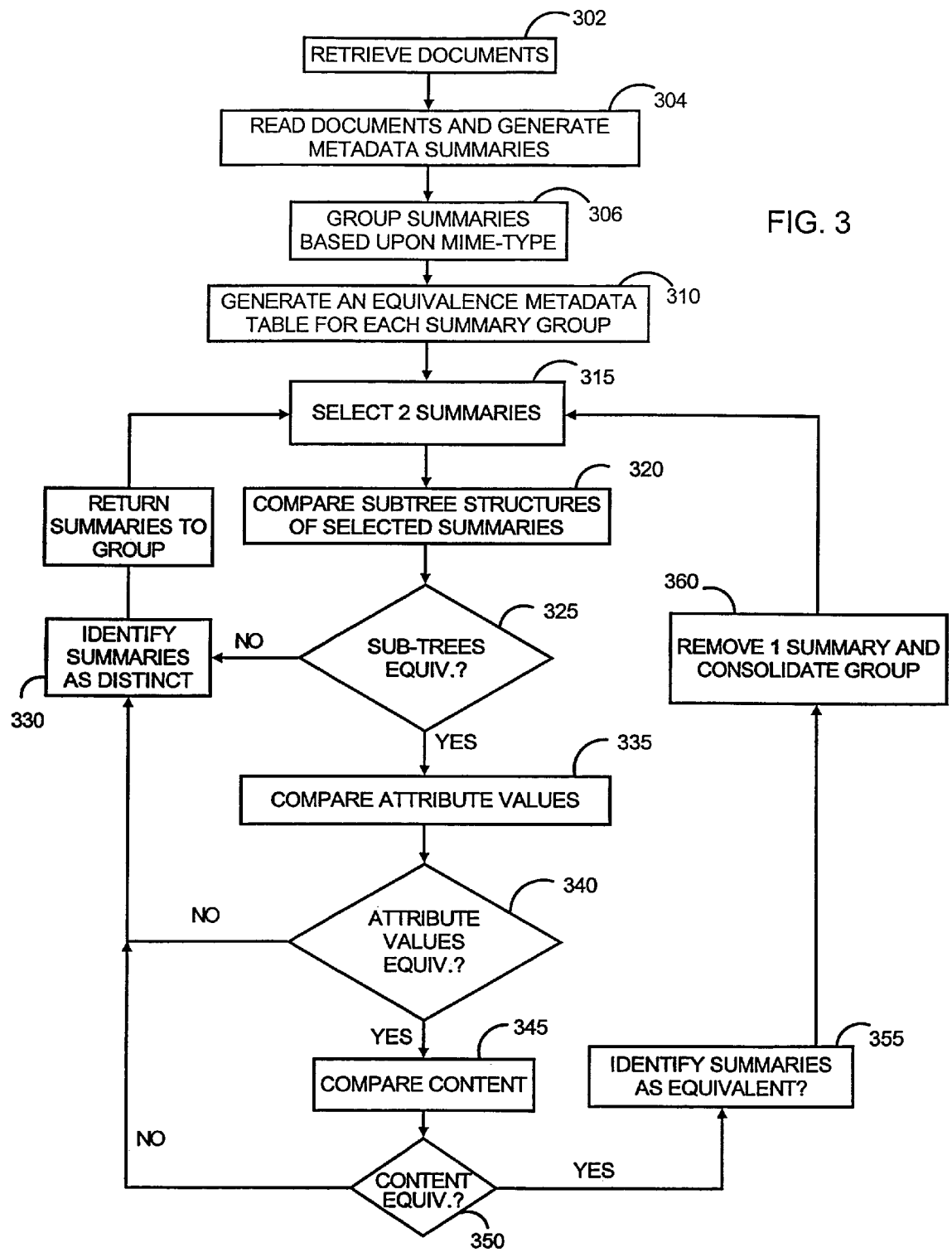
FIG. 3 illustrates a method for classifying posted web pages in accordance with one embodiment of the present invention.

FIG. 3 illustrates a method for classifying documents, such as posted web pages, in accordance with the present invention. Initially at 302, posted documents are retrieved by the system. This process is preferably performed using the web crawler module described above. Next at 304, the metadata parser module reads the downloaded document and generates a metadata summary which summarizes the web page's content and structure as depicted in FIG. 2A. The metadata summary is stored in the summary repository until accessed by the search engine module, as described above. The web crawler may follow links such as hypertext links associated with web pages or other documents as it circulates through the collection of posted documents.

At 306, the metadata summaries are collected into x different summary groups, each summary group containing summaries having a particular attribute-type. In the illustrated embodiment, summaries having the same mime-type are grouped. In this embodiment, a first summary group labeled F may include n summaries of .gif files ($f_1, f_2, f_3, \ldots f_n$), .txt file summaries may be placed into a second summary group, html file summaries placed into a third summary group, and Java file summaries placed into a fourth summary group. Of course, metadata summaries corresponding to other mime-type files may also be received and grouped as well.

Those of skill in the art will appreciate that other file attributes may be used as the grouping criteria either alternatively or in addition to the file mime-type. For instance, the document's content-length may be used as a grouping criteria either independently or in combination with the document's mime-type. Other file attributes may be used as a grouping criteria as well.

Next at 310, an equivalence metadata table (EMT) is generated for each summary group to record the equivalence state between compared metadata summaries. In a preferred embodiment in which a summary group includes $f_n$ metadata summaries, the EMT is a two-dimensional matrix of $f_n$ rows by $f_n$ columns, each off-diagonal entry indicating the equivalence state between the corresponding rows and columns. In the preferred embodiment, a 0 is entered if the two intersecting metadata summaries are found to be distinct, and a 1 is entered if the two summaries are found to be duplicative, as further described below.

At 315, a summary group is chosen and two summaries contained therein are selected for comparison. By grouping similar mime-type files, unnecessary file comparisons, e.g., comparisons between .txt and .gif files are avoided, thereby accelerating the classification process. An embodiment of this process is further illustrated in FIG. 4.

At 320, the sub-tree structures of the selected metadata summaries are compared. As explained above, each metadata summary includes a metadata portion 230 (FIG. 2) having one or more sub-tree structures, each sub-tree having one or more nodes. In the preferred embodiment, the structural comparison process includes comparing the sub-tree structures of the metadata portion to determine equivalence. In an alternative embodiment, one or more sub-tree structures external to the metadata portion are compared either alternatively, or in addition to, the metadata portion sub-trees.

At 325, a determination is made as to whether the structures of the compared sub-trees are equivalent. If not, the first and second metadata summaries and their corresponding documents (web pages) are identified as distinct. This process is performed in one embodiment by entering a 0 into the aforementioned equivalence metadata table at the appropriate entry location. Both metadata summaries are subsequently returned to the summary group and the classification process continues at 320 where a subsequent comparison is initiated. By comparing the metadata summaries initially on a structural level, the time needed to classify documents as distinct is significantly reduced compared to the conventional textual comparison process.

If the structures of the first and second summary sub-trees are determined to be equivalent, the process continues at 335, where the attribute values within the metadata portion sub-tree are compared. The attribute value comparison process may include locating the attribute title within the appropriate sub-tree and storing its corresponding attribute value. The stored attribute values are subsequently compared and their equivalence determined at 340. If the attribute values are not equivalent, the first and second metadata summaries and their corresponding documents are identified as distinct. This process is performed in one embodiment by entering a 0 into the aforementioned equivalence metadata table at the appropriate entry location. Both metadata summaries are subsequently returned to the summary group.

If the compared attribute values are equivalent, the process continues at 345, where the text located within the selected sub-tree structures is compared. The text comparison process may include locating and storing text and comparing the stored text of the two selected summaries. As can be seen, the attribute and text comparison process in the present invention is performed only over a portion of the total text of the document, greatly reducing the amount of time needed to compare the documents. The process at 320, 335 and 345 are preferably executed using the above-described summary consolidator module 180 shown in FIG. 1B. In particular, sub-tree comparator 182, attribute comparator 184, and text comparator 186 may be used to perform the processes of 320, 335, and 345, respectively.

If the text comparison process indicates that the documents contain identical text, the two metadata summaries and their corresponding web pages are identified as duplicates. This process is performed in one embodiment by entering a 1 into the aforementioned equivalence metadata table at the appropriate entry location. In one embodiment, one of the duplicative metadata summaries is removed and the summary group consolidated. A log which indicates some of the removed summary's attributes (such as the URL, date, etc.) may be made.

The aforementioned steps are repeated until each of the metadata summaries in all of the summary groups are compared and their equivalence states are entered into the corresponding EMT. At the conclusion of the process, a set of EMTs store data which indicate the equivalence states of the retrieved documents. In addition, the summary repository is consolidated into an "ordered summary repository" which stores only those metadata summaries corresponding to content-unique documents.

The process illustrated in FIG. 3 may be repeated to retrieve and compare newly downloaded documents. For instance, a new document may be downloaded and subsequently placed into a summary group of the same mime-type. The comparison process is subsequently performed and an EMT is generated The ordered metadata repository and the EMTs may be used in a variety of ways to obtain useful information about the summarized documents. In one embodiment, the ordered metadata repository may be used as a search engine source from which content-unique documents are produced in response to entered keywords. In another embodiment, the EMTs may be accessed to show all of the documents which contain the same text as a qualifying search result entry. In another embodiment, the search engine may query the user for additional selection criteria, such as the desired date, or URL in order to choose between two identified duplicative documents.

Figure 4:
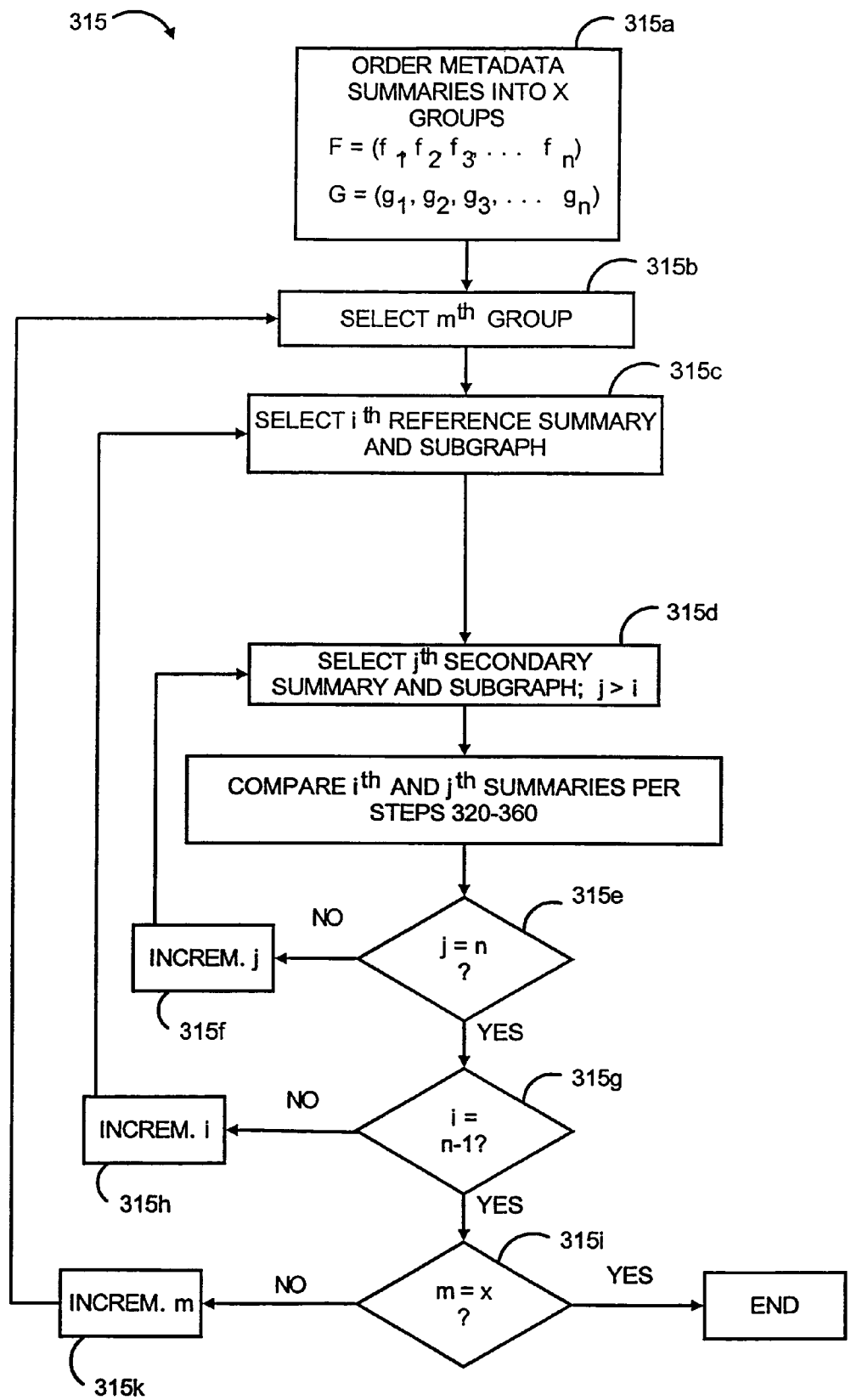
FIG. 4 illustrates a method for selecting metadata summaries in accordance with the present invention.

FIG. 4 illustrates one embodiment of the processes shown in 315 for selecting metadata summaries in accordance with the present invention. Initially at 315$a$ similar mime-type files are ordered within the group as described above. For instance, F includes n metadata summaries $\{f_1, f_2, f_3, \ldots f_n\}$ received in the repository which are summaries of .txt files. Other mime-type groups may also be included.

At 315$b$, one of the $m^{th}$ groups, for instance the F group, is selected for comparison. Next at 315$c$, a reference summary $f_i$ is selected and the summary's sub-tree is mapped. During the first iteration of the process, i=1 and the first metadata summary is selected and sub-graphed as the reference summary against which the remaining summaries will be compared.

Next at 315$d$ a secondary summary $f_j$, is selected and its sub-tree is mapped. In the preferred embodiment, j≧i, i.e., during the first iteration, the second metadata summary of the group is selected and its sub-tree structure mapped. Subsequently, the reference and secondary summaries $f_i$ and $f_j$ are compared as described above in steps 320-360.

Once the comparison has been performed, a determination at 315$e$ is made as to whether j is equal to n, i.e., whether the last summary within the selected group has been compared to the reference summary $f_i$. If not, j is incremented at 315$f$ and the process returns to 315$d$ where the next summary within the same group is selected and sub-tree structure compared to primary summary $f_i$. If j=n indicating that all of the i-1 summaries have been compared to $f_i$, the process continues at 315$g$ where a determination is made as to whether i=n-1.

If at 315$g$, a determination is made that I is not equal to n-1, the process continues at 315$h$ where I is incremented, thereby selecting the next file as the reference file to which all of the subsequent files will be compared. If at 315$g$, n is determined to be equal to i-1, then all of the summaries have been compared against each other and a different group may be selected. At 315$i$, a determination is made as to whether the group index m is equal to the x, indicating the last group. If not, the group index m is incremented at 315$k$ and the process continues at 315$b$. If m=x, all of the groups have been compared and the classification process is complete.

The present invention has now been described in terms of the exemplary embodiments. Those of skill in the art will appreciate that various modifications and alterations may be made while still remaining within the present invention, the scope of which is legally defined as the metes and boundaries of the following claims:

What is claimed is:

1. A method for classifying electronically posted documents, the method comprising:

receiving a first document and a second document;

generating a first metadata summary for the first document and a second metadata summary for the second document, wherein the first metadata summary includes a first plurality of sub-trees and the second metadata summary includes a second plurality of sub-trees, wherein each of the sub-trees includes a plurality of nodes, wherein each of the sub-trees in the first and second pluralities of sub-trees comprises a structural format defined by a plurality of hierarchical structural constructs, and wherein subsets of the metadata summaries are grouped into a set of different summary groups based on a mime-type designation associated with each subset of the metadata summaries;

comparing the first and second metadata summaries on a structural level by comparing the entire structural format defined by the plurality of hierarchical structural constructs of the sub-trees of the first metadata summary with the entire structural format defined by the plurality of hierarchical structural constructs of the sub-trees of the second metadata summary;

identifying the first and second documents as distinct if the entire structural formats of the sub-trees of the first and second metadata summaries are not equivalent;

if the entire structural formats of the sub-trees of the first and second metadata summaries are equivalent, performing a further comparison of the first and second metadata summaries, wherein the further comparison of the first and second metadata summaries includes the sub-steps of:

comparing the first and second metadata summaries on a textual level by comparing textual content from the first document that is contained in the sub-trees of the first metadata summary with textual content from the second document that is contained in the sub-trees of the second metadata summary;

identifying the first and second documents as distinct if the textual content within the sub-trees of the first and second metadata summaries are not equivalent;

before comparing the first and second metadata summaries on a textual level, comparing the first and second metadata summaries on an attribute level by comparing attribute values within the sub-trees of the first metadata summary with attribute values within the sub-trees of the second metadata summary; and identifying the first and second documents as distinct if the attribute values within the sub-trees of the first and second metadata summaries are not equivalent.

2. The method of claim 1, further comprising identifying the first and second documents as duplicates if the textual content within the sub-trees of the first and second metadata summaries are equivalent.

3. The method of claim 2, further comprising removing the second metadata summary if the first and second documents are identified as duplicates.

4. The method of claim 1, further comprising:
defining a first equivalence metadata table comprising:
a first row corresponding to the first metadata summary;
a second row corresponding to the second metadata summary;
a first column corresponding to the first metadata summary; and
a second column corresponding to the second metadata summary,
wherein the step of identifying the first and second documents as distinct if the structural formats of the sub-trees of the first and second metadata summaries are not equivalent comprises storing a zero value in the first row and second column position of the first equivalence metadata table.

5. The method of claim 4, wherein the step of identifying the first and second documents as distinct if the textual content within the sub-trees of the first and second metadata summaries are not equivalent comprises storing a zero value in the first row and second column position of the first equivalence metadata table.

6. The method of claim 1, further comprising:
defining a first equivalence metadata table comprising:
a first row corresponding to the first metadata summary;
a second row corresponding to the second metadata summary;
a first column corresponding to the first metadata summary; and
a second column corresponding to the second metadata summary,
wherein the step of identifying the first and second documents as distinct if the attribute values within the sub-trees of the first and second metadata summaries are not equivalent comprises storing a zero value in the first row and second column position of the first equivalence metadata table.

7. A system for classifying electronically posted documents, the system comprising:
a memory;
a processor communicatively coupled to the memory;
a metadata parser module coupled to receive electronically posted documents, the metadata parser configured to output a metadata summary for each of the posted documents, wherein each of the metadata summaries comprises a plurality of sub-trees and each of the sub-trees includes a plurality of nodes, wherein each of the sub-trees in the pluralities of sub-trees comprises a structural format defined by a plurality of hierarchical structural constructs, and wherein subsets of the metadata summaries are grouped into a set of different summary groups based on a mime-type designation associated with each subset of the metadata summaries;
a summary repository coupled to receive and store the metadata summaries; and
a summary consolidator coupled to the summary repository, the summary consolidator configured to:
select a first metadata summary and a second metadata summary from one of the summary groups in the set of different summary groups;
compare the first metadata summary and the second metadata summary on a structural level by comparing the entire structural format defined by the plurality of hierarchical structural constructs of the sub-trees of the first metadata summary with the entire structural format defined by the plurality of hierarchical structural constructs of the sub-trees of the second metadata summary;
identify the first and second documents corresponding to the first and second metadata summaries as distinct if the entire structural formats of the sub-trees of the first and second metadata summaries are not equivalent; and
if the entire structural formats of the sub-trees of the first and second metadata summaries are equivalent, further compare the first and second metadata summaries,
wherein the further comparison of the first and second metadata summaries includes:
comparing the first and second metadata summaries on a textual level by comparing textual content from the first document that is contained in the sub-trees of the first metadata summary with textual content from the second document that is contained in the sub-trees of the second metadata summary;
identifying the first and second documents corresponding to the first and second metadata summaries as distinct if the textual content within the sub-trees of the first and second metadata summaries are not equivalent;
before comparing the first and second metadata summaries on a textual level, comparing the first and second metadata summaries on an attribute level by comparing attribute values within the sub-trees of the first metadata summary with attribute values within the sub-trees of the second metadata summary; and
identifying the first and second documents corresponding to the first and second metadata summaries as distinct if the attribute values within the sub-trees of the first and second metadata summaries are not equivalent.

8. A program product for use in a computer system that executes program steps recorded in a computer-readable media to perform a method for classifying electronically posted documents, the program product comprising:
a record-able media;
a program of computer-readable instructions executable by the computer system to perform processes comprising the steps of:
receiving a first document and a second document;
generating a first metadata summary for the first document and a second metadata summary for the second document, wherein the first metadata summary includes a first plurality of sub-trees and the second metadata summary includes a second plurality of sub-trees, and wherein each of the sub-trees includes a plurality of nodes, wherein each of the sub-trees in the first and second pluralities of sub-trees comprises a structural format defined by a plurality of hierarchical structural constructs, and wherein subsets of the metadata summaries are grouped into a set of different summary groups based on a mime-type designation associated with each subset of the metadata summaries;
comparing the first and second metadata summaries on a structural level by comparing the entire structural format defined by the plurality of hierarchical structural constructs of the sub-trees of the first metadata summary with the entire structural format defined by the plurality of hierarchical structural constructs of the sub-trees of the second metadata summary;

identifying the first and second documents as distinct if the entire structural formats of the sub-trees of the first and second metadata summaries are not equivalent;

if the entire structural formats of the sub-trees of the first and second metadata summaries are equivalent, performing a further comparison of the first and second metadata summaries, wherein the further comparison of the first and second metadata summaries includes the sub-steps of:

comparing the first and second metadata summaries on a textual level by comparing textual content from the first document that is contained in the sub-trees of the first metadata summary with textual content from the second document that is contained in the sub-trees of the second metadata summary;

identifying the first and second documents as distinct if the textual content within the sub-trees of the first and second metadata summaries are not equivalent;

before comparing the first and second metadata summaries on a textual level, comparing the first and second metadata summaries on an attribute level by comparing attribute values within the sub-trees of the first metadata summary with attribute values within the sub-trees of the second metadata summary; and identifying the first and second documents as distinct if the attribute values within the sub-trees of the first and second metadata summaries are not equivalent.

9. The program product of claim 8, further comprising the step of identifying the first and second documents as duplicates if the textual content within the sub-trees of the first and second metadata summaries are equivalent.

10. The program product of claim 9, further comprising the step of removing the second metadata summary if the first and second documents are identified as duplicates.

* * * * *